May 26, 1925.
A. F. MASURY ET AL
1,539,263
CUSHION CONNECTION FOR VEHICLE CONSTRUCTION
Filed March 14, 1922   2 Sheets-Sheet 1

INVENTORS
Alfred F. Masury
BY  August H. Leipert
Redding & Greeley
ATTORNEYS

Patented May 26, 1925.

1,539,263

UNITED STATES PATENT OFFICE.

ALFRED F. MASURY AND AUGUST H. LEIPERT, OF NEW YORK, N. Y., ASSIGNORS TO INTERNATIONAL MOTOR COMPANY, OF NEW YORK, N. Y., A CORPORATION OF DELAWARE.

CUSHION CONNECTION FOR VEHICLE CONSTRUCTION.

Application filed March 14, 1922. Serial No. 543,661.

*To all whom it may concern:*

Be it known that we, ALFRED F. MASURY and AUGUST H. LEIPERT, citizens of the United States, and residents, respectively, of the borough of Manhattan and of the borough of Queens, of the city of New York, in the State of New York, pray that Letters Patent of the United States may be granted to us for new and useful Improvements in Cushion Connections for Vehicle Construction, of which the following is a specification, reference being had to the accompanying drawings, forming a part hereof.

This invention relates to non-metallic connections for use between metallic units of a motor vehicle. The material employed is resilient and, in practice, is preferably rubber molded in suitable forms and dimensions for convenient assembling and securing to the units to be connected. In its preferred application the invention will be found most advantageous when employed as a connection between the end of a vehicle spring and the frame of the vehicle. More particularly, the invention is concerned with a non-metallic resilient connection of the character described in which the material is maintained under constant tension by the load. It will be understood, as the description proceeds, that various embodiments embodying the principles referred to above may be employed by one skilled in the art without departing from the spirit of the invention. For the purposes of this application there have been illustrated, by way of example, three suitable embodiments. Referring now to the drawings:

Figure 1:
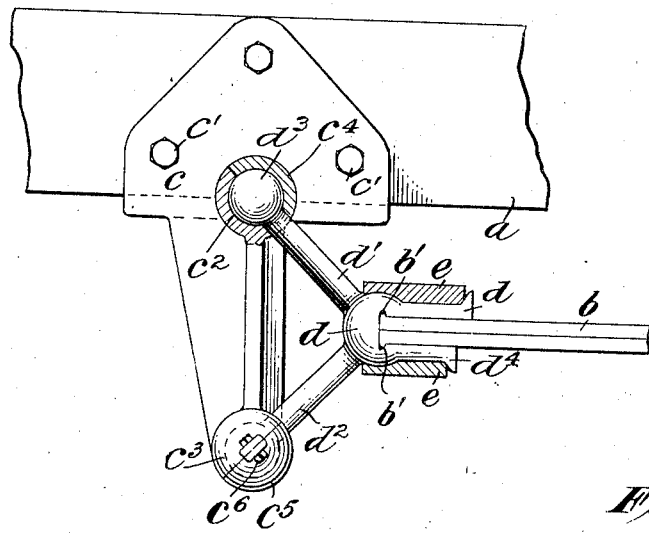
Figure 1 is a view, partly in side elevation and partly in section, of an improved connection as applied between the end of the vehicle spring and a side frame member.
Figure 2:
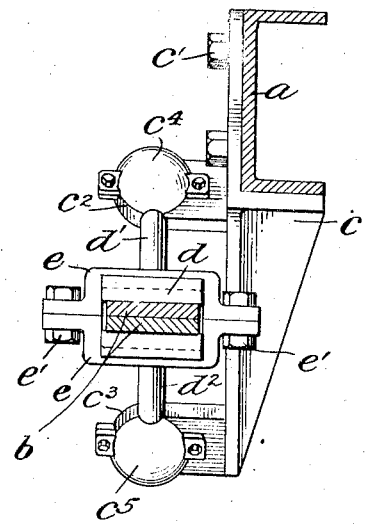
Figure 2 is a view in transverse section through the vehicle spring shown in Figure 1, the elements of the connection proper appearing in end elevation.

In the embodiment shown in Figure 1 the chassis of the vehicle, as exemplified by the side frame member $a$ is supported from the vehicle spring $b$ by means of the improved non-metallic connection which, as indicated hereinbefore, is of resilient material, such as rubber, and is normally held under tension by the weight of the chassis. This type of connection is wholly of a non-metallic character and no metal of the element to be connected to and supported by the other element comes in contact with the metal of said last-named element. On the side frame member $a$ is secured a suitable bracket $c$ as by bolts $c'$. This bracket has formed therein seats $c^2$, $c^3$, which may be spaced apart and disposed substantially in the same vertical plane although the objects of the invention might be realized in a construction in which the seats, while spaced, rested in some other plane. The problem is to connect the bracket $c$ to the end of the spring $b$ so that the load will be carried and, at the same time, excessive relative movement between the frame and the spring checked, that is, snubbed. The resilient connection shown in Figures 1 and 2 is formed of molded rubber and includes a split body section $d$ which embraces the end of the spring $b$ and two angularly disposed link-like arms $d'$, $d^2$, the ends of which are enlarged as indicated at $d^3$. The enlarged ends of the arms $d'$, $d^2$, may be clamped within their respective seats $c^2$, $c^3$, by caps $c^4$, $c^5$, respectively, secured removably in place by bolts $c^6$. The body portion $d$ of the resilient connection is clamped on to the end of the spring $b$ by means of complementary clamping pieces $e$ which embrace the spring and the rubber and when bolted together as by means of bolts $e'$, compress the rubber snugly on to the metal of the spring. The ends $d^4$ of the split sections of the body $d$ of the connection may be enlarged as indicated so as to fall outside of the clamping pieces $e$ and thereby facilitate firm engagement between the rubber and the metal. This clamping action is further assisted by enlarging the end of the spring $b$ as indicated at $b'$ so that it will be pressed into the rubber when the clamping pieces $e$ are bolted together. In practice, the arms $d'$, $d^2$, of the rubber will be of substantially equal length and form with the seats $c^2$, $c^3$, in the bracket $c$ an isosceles triangle. The apex of the triangle will be found in the body $d$. The load of the chassis will be carried through the downwardly extending arm $d^2$ which forms a resilient shackle connection between the end of the spring and the frame $a$. This connection is normally maintained under tension by the load of the vehicle. Excessive upward movement of the frame $a$ with respect to the spring $d$, as might occur in rebounding, is snubbed by means of the other resilient arm $d'$, as will be apparent. The bracket and resilient arms may be so proportioned that the arms, when clamped at their ends to the bracket and secured at their juncture to the end of the spring, are maintained under tension at all times, the tension of the one opposing the tension of the other. Movements in either direction are yieldingly resisted by means of the non-metallic connection between the frame and spring.

Figure 3:
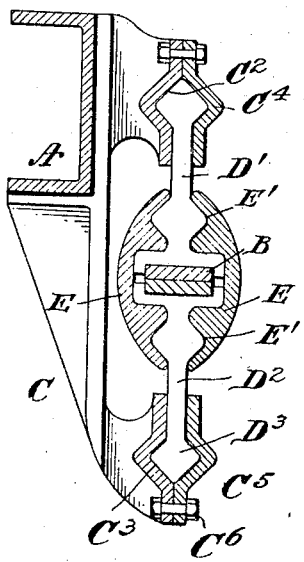
Figure 3 is a sectional view of a connection of somewhat different form in which the upper and lower connecting elements are normally in line with one another.

In the form shown in Figure 3 the frame A is supported from the spring B by means of a vertical non-metallic resilient link $D^2$ while excessive relative movements upward of the frame A is snubbed by the upwardly extending link $D'$ of non-metallic resilient material. Two links $D'$, $D^2$, may be of similar construction and are disposed in line with one another. The frame A has secured thereto a bracket C which is formed with a seat $C^3$ in which is clamped an enlarged portion $D^3$ of the link $D^2$. A cap $C^5$ is bolted over the seat $C^3$ by means of bolts $C^6$ and clamps the link securely to the bracket C. A similar seat $C^2$ is formed in the upper part of the bracket C and the link $D'$ is similarly clamped in the seat $C^2$ by means of a cap $C^4$. The ends of the links $D'$, $D^2$, in proximity to the spring B may be molded so as to embrace the contacting surfaces of the spring. These ends are clamped to the spring by means of complementary clamping pieces E which are formed with suitable opposed seats $E'$ to secure the links $D'$, $D^2$, in fixed relation to each other and to the spring B.

Figure 4:
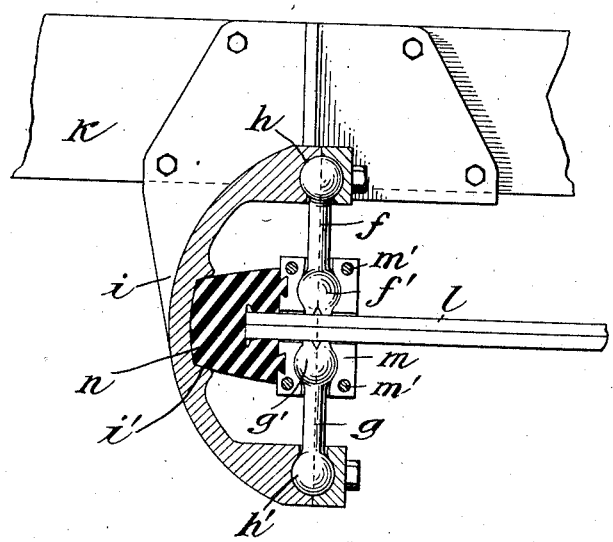
Figure 4 is a view in longitudinal section through a supporting bracket for still another type of connection in which an additional block of rubber or the like is interposed between the end of the spring and the bracket to transmit stresses directly therebetween.
Figure 5:
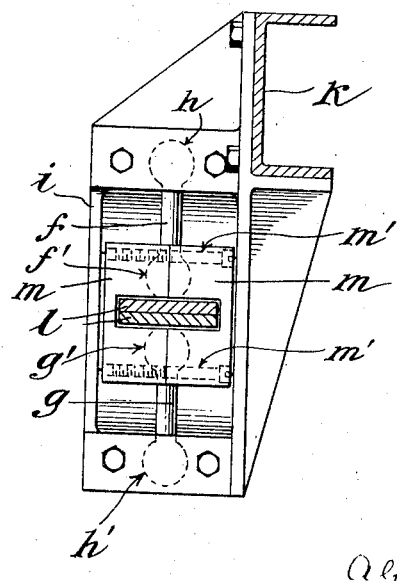
Figure 5 is a view in transverse section through the spring shown in Figure 4, the parts of the connection being shown in end elevation.

In Figure 4 a construction generally similar to that shown in Figure 3 is illustrated. Upper and lower non-metallic resilient links $f$, $g$, are clamped, respectively, to seats $h$, $h'$, in a bracket $i$ which is bolted to the side frame member $k$ of the vehicle. These links are secured in the same vertical line and clamped in fixed relation to one another and to the vehicle spring $l$ by means of clamping pieces $m$ which embrace the spring and retaining bolts $m'$ therefor. The ends of the links $f$, $g$, within the clamping pieces $m$ may be enlarged as indicated at $f'$, $g'$, to facilitate the clamping. In this embodiment it is proposed to interpose a resilient block such as $n$ between the end of the spring $l$ and the bracket $i$ so that stresses will be transmitted yieldingly therebetween. This adaptation may be important in the case of the front vehicle spring and where the spring is used to transmit the driving force, as in a Hotchkiss drive. The block $n$ may be maintained in proper relation to the parts by engaging it with the end of the spring $l$ and seating it on its opposite face in a seat $i'$ provided therefor in the bracket $i$.

The embodiments shown herein will serve to indicate the permissible variations in form and arrangement and emphasize the characteristic features of the improved connection.

What we claim is:

1. In combination with the spring and frame of a motor vehicle, a wholly non-metallic support interposed between an end of the spring and the frame and comprising a block of non-metallic yielding material engaged at one end with the spring, a bracket carried with the frame and secured to the lower end of said block, a second block of non-metallic resilient material connected at one end with the spring and at the other end with the bracket and disposed in line with the first-named block, and a third block of non-metallic yielding material interposed between the end of the spring and the bracket to transmit longitudinal stresses therebetween.

2. In combination with the spring and frame of a motor vehicle, a wholly-non-metallic support interposed between an end of the spring and the frame and comprising a strip of non-metallic elastic material engaged at one end with the spring and secured to the frame, a second strip of non-metallic elastic material connected at one end with the spring and at the other end with the frame upon the opposite side thereof to oppose yieldingly the action of the first named strip, and means to maintain the strips under tension.

This specification signed this 9th day of March A. D. 1922.

ALFRED F. MASURY.
AUGUST H. LEIPERT.